US010011255B2

(12) United States Patent
Ishino et al.

(10) Patent No.: US 10,011,255 B2
(45) Date of Patent: Jul. 3, 2018

(54) VEHICLE BRAKE SYSTEM AND VEHICLE BRAKE SYSTEM CONTROL METHOD

(71) Applicant: HONDA MOTOR CO., LTD., Tokyo (JP)

(72) Inventors: Keisuke Ishino, Saitama (JP); Shuichi Okada, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/522,181

(22) PCT Filed: Oct. 29, 2015

(86) PCT No.: PCT/JP2015/080539
§ 371 (c)(1),
(2) Date: Apr. 26, 2017

(87) PCT Pub. No.: WO2016/072346
PCT Pub. Date: May 12, 2016

(65) Prior Publication Data
US 2017/0313294 A1 Nov. 2, 2017

(30) Foreign Application Priority Data
Nov. 7, 2014 (JP) .................................. 2014-226559

(51) Int. Cl.
G06F 7/70 (2006.01)
B60T 13/66 (2006.01)
(Continued)

(52) U.S. Cl.
CPC ............ B60T 13/662 (2013.01); B60T 7/042
(2013.01); B60T 7/12 (2013.01); B60T 8/171
(2013.01);
(Continued)

(58) Field of Classification Search
CPC .......... B60T 13/662; B60T 7/042; B60T 7/12;
B60T 8/171; B60T 8/172; B60T 13/745;
(Continued)

(56) References Cited

U.S. PATENT DOCUMENTS 8,366,210 B2 * 2/2013 Maki ...................... B60K 6/445
303/151
8,523,297 B2 * 9/2013 Morishita ................. B60T 1/10
303/151
(Continued)

FOREIGN PATENT DOCUMENTS

JP 2012-144059 8/2012

Primary Examiner — Shardul D Patel
(74) Attorney, Agent, or Firm — Rankin, Hill & Clark LLP

(57) ABSTRACT

A vehicle brake system for giving an excellent brake feeling to a driver includes: a stroke detector configured to detect a stroke of a brake pedal; a brake fluid pressure generator including a motor actuator and configured to generate a brake fluid pressure by operation of the motor actuator, and a controller configured to control the operation of the motor actuator on the basis of a detected value by the stroke detector. The controller has a base required-deceleration map for obtaining a base required-deceleration associated with a detected value by the stroke detector; a responsive-feeling required-deceleration map for obtaining a responsive-feeling required-deceleration associated with the detected value by the stroke detector; and a phase-lag processor applying phase-lag processing on the responsive-feeling required-deceleration, and control the operation of the motor actuator on the basis of the required-deceleration and the responsive-feeling required-deceleration applied with the phase-lag processing.

5 Claims, 4 Drawing Sheets

(51) Int. Cl.
*B60T 7/04* (2006.01)
*B60T 8/171* (2006.01)
*B60T 8/172* (2006.01)
*B60T 13/74* (2006.01)
*B60T 7/12* (2006.01)

(52) U.S. Cl.
CPC ............ *B60T 8/172* (2013.01); *B60T 13/745* (2013.01); *B60T 2220/04* (2013.01); *B60T 2270/82* (2013.01)

(58) Field of Classification Search
CPC .... B60T 2220/04; B60T 2270/82; B60T 8/17; B60T 8/1755; B60W 10/08
USPC ...... 701/70, 71, 78, 82, 83; 303/151, 152, 2, 303/3, 67
See application file for complete search history.

(56) References Cited

U.S. PATENT DOCUMENTS

| | | | | |
|---|---|---|---|---|
| 8,998,352 B2* | 4/2015 | Imamura | ............... | B60T 8/1755 303/115.4 |
| 2010/0222978 A1* | 9/2010 | Kodama | ................... | B60L 7/26 701/70 |

* cited by examiner

_VEHICLE BRAKE SYSTEM AND VEHICLE
BRAKE SYSTEM CONTROL METHOD_

CROSS REFERENCE TO RELATED
APPLICATIONS

This application claims the benefit of Japan Patent Application No. 2014-226559, filed on Nov. 7, 2014, titled "Vehicle brake system and vehicle brake control method".

TECHNICAL FIELD

The present invention relates to a vehicle brake system and a vehicle brake control method.

BACKGROUND ART

A by-wire vehicle brake system that makes a slave cylinder generate a brake fluid pressure responding to a stroke of a brake pedal is well-known. Relating to such a vehicle brake system, a well-known technique for improving a brake feeling of a driver (feeling of secureness for braking effect, actual feeling that the brake is working well) is disclosed by, for example, Patent Document 1.

Patent Document 1 discloses a technique of selecting either one of a normal map and a build-up map for setting a brake fluid pressure reference value larger than that of the normal map to set the brake fluid pressure reference value on the basis of the map selected.

CITATION LIST

Patent Literature

Patent Literature 1: Japanese laid-open patent publication No. JP2012-144059A

SUMMARY OF INVENTION

Technical Problem

According to the technique described in Patent Document 1, if the brake pedal is kept to be depressed, gradually increasing the braking force on the basis of the build-up map provides the driver with a feeling that the braking effect increases, mainly in a late period of braking.

However, Patent Document 1 does not describe a technique for providing the driver with a real feeling of the well-working braking effect in an early period of braking (immediately after the depressing of the brake has been held), and there is a need for further improvement of the brake feeling.

Accordingly, the present invention aims to provide a vehicle brake system and a vehicle brake control method for providing the driver with the good brake feeling.

Solution to Problem

As a means for solving the above problem, the present invention provides a vehicle brake system including: a stroke detector configured to detect a stroke of a brake pedal; a brake fluid pressure generator including a motor actuator and configured to generate a brake fluid pressure by operation of the motor actuator, and a controller configured to control the operation of the motor actuator on the basis of a detected value by the stroke detector, the controller having a first map for obtaining a first required-deceleration associated with a detected value by the stroke detector; a second map for obtaining a second required-deceleration associated with the detected value by the stroke detector; and a phase-lag processor applying phase-lag processing on the second required-deceleration, to control the operation of the motor actuator on a basis of the first required-deceleration and the second required-deceleration applied with the phase-lag processing.

According to such a configuration, the controller applies the phase-lag processing using the phase-lag processor on the second required-deceleration obtained according to the second map. Therefore, after the brake pedal is depressed, after the first required-deceleration increases, the second required-deceleration increases later, which is accompanied by an increase of the braking force. This causes a result that the braking effect becomes stronger after starting to keep the brake pedal depressed, which can give the driver a feeling of secureness (brake feeling) such that the brake is working firmly. Further, the first required-deceleration determined on the basis of the first map enables the braking force to be generated without a delay in response to a sudden braking.

In addition, the controller preferably shortens a lag time for the phase-lag processing as a vehicle speed is lower.

According to such a configuration, as the vehicle speed is lower, the lag time for generating the second required-deceleration is set shorter. It should be understood that the depression amount (stroke) of the brake pedal is often small when the vehicle speed is low; and that too long lag time for the second required-deceleration could cause the driver to feel uncomfortable. As described above, the driver's uncomfortable feeling can be prevented by shortening the lag time of the second required-deceleration as the vehicle speed is lower.

Further, when the stroke of the brake pedal is kept, the controller preferably increases a third required-deceleration gradually, and controls the operation of the motor actuator on the basis of the first required-deceleration, the second required-deceleration applied with the phase-lag processing, and the third required-deceleration.

According to such a configuration, when the stroke of the brake pedal is being held, the third required-deceleration is gradually increased, and the motor actuator is operated on the basis of the first required-deceleration, the second required-deceleration, and the third required-deceleration. Gradually strengthening the braking effect on the basis of the third required-deceleration enables to give the driver feeling of secureness that the brakes are working well.

In another aspect, the present invention provides a vehicle brake control method executed by a vehicle brake system including: a stroke detector configured to detect a stroke of a brake pedal; a brake fluid pressure generator including a motor actuator and configured to generate a brake fluid pressure by operation of the motor actuator, and a controller configured to control the operation of the motor actuator on the basis of a detected value by the stroke detector, the method including steps executed by the controller of: determining on a basis of a first map a first required-deceleration responding to a detected value by the stroke detector; determining on a basis of a second map a second required-deceleration associated with the detected value by the stroke detector; and controlling the operation of the motor actuator on the basis of the first required-deceleration and the second required-deceleration applied with a phase-lag processing by a phase-lag processor.

According to such a configuration, the braking effect becomes stronger after the brake pedal is started to be kept depressed, which can give the driver a feeling of secureness (brake feeling) such that the brake is working firmly. Further, the braking force is able to be generated without a delay in response to a sudden braking.

Advantageous Effects of Invention

The present invention may provide a vehicle brake system and a vehicle brake control method providing the driver with a comfortable brake feeling.

DESCRIPTION OF EMBODIMENTS

Hereinafter, a detailed description is provided of the vehicle brake system and brake control method for a vehicle according to an exemplary embodiment of the present invention, with reference to the drawings.

Embodiment

<Configuration of Vehicle Brake System>

Figure 1:
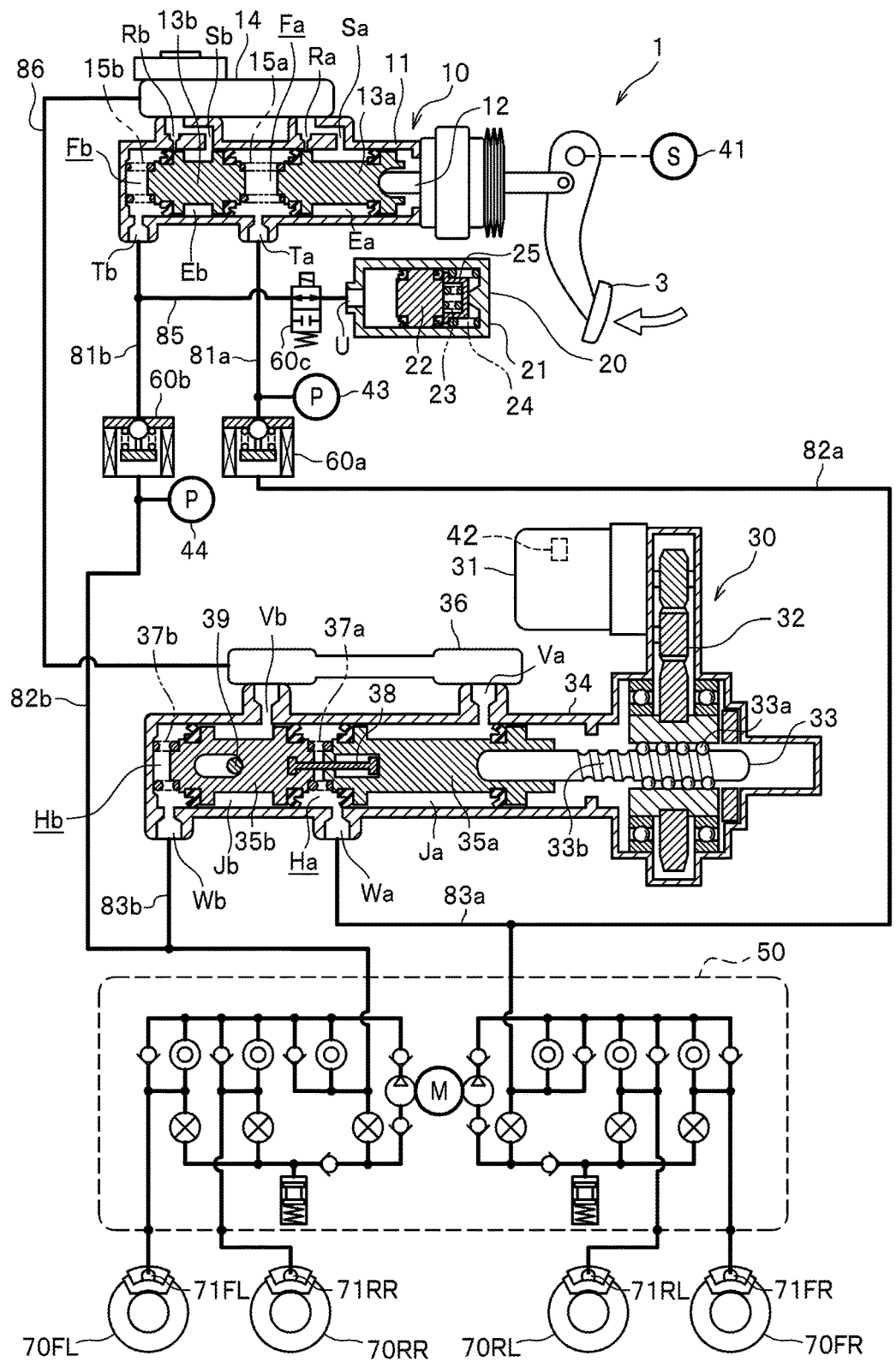
FIG. 1 is a schematic configuration diagram of a vehicle brake system according to an embodiment of the present invention.

FIG. 1 shows a schematic configuration of a vehicle brake system 1 according to the present embodiment.

The vehicle brake system 1 according to the present embodiment is installed in a vehicle driven by an internal combustion engine, such as a car, an electric car, a hybrid car, and a fuel-cell car, and has a function of generating a braking force to be applied on each wheel of the vehicle.

The vehicle brake system 1 is a by-wire brake system that operates a slave cylinder 30 in response to a stroke of a brake pedal 3 to brake a vehicle using brake fluid pressure generated by the slave cylinder 30. Note that when the by-wire brake system is in malfunctioning status, master cut valves 60a and 60b, which will be described later, are designed to be opened to apply a braking force on each wheel through a fluid pressure from a master cylinder 10.

The vehicle brake system 1 includes: the master cylinder 10, a stroke simulator 20, the slave cylinder 30, sensors such as a stroke sensor 41, and VSA (TM; Vehicle Stability Assist) unit 50, the master cut valves 60a and 60b, and a controller 90 (see FIG. 2).

<Master Cylinder>

The master cylinder 10 is a device generating a fluid pressure depending on a depression force on the brake pedal 3 at least in pipe-tubes 81a and 81b. The master cylinder 10 is, for example, a tandem type cylinder as shown in FIG. 1 and includes: a cylinder body 11, a push-rod 12, pistons 13a and 13b, and spring members 15a and 15b.

Viewing FIG. 1 in an order from right to left, the cylinder body 11 accommodates a piston 13a, a spring member 15a, a piston 13b, and a spring member 15b in a substantially coaxial manner. When a driver depresses the brake pedal 3, a depression force acts via the push rod 12 on the piston 13a so that a fluid pressure is generated in pressure chambers Fa and Fb.

Further, when the brake pedal 3 is returned and the pistons 13a and 13b return back, the pressure chamber Fa communicates with a supply port Sa and a back chamber Ea via the relief port Ra, and also communicates with a reservoir 14 (The same applies to the pressure chamber Fb).

Note that an output port Ta of the pressure chamber Fa is connected to wheel cylinders 71FR (right front wheel) and 71RL (left rear wheel) via the pipe-tube 81a, the master cut valve 60a, the pipe-tube 82a, and the VSA unit 50.

Further, an output port Tb of the pressure chamber Fb is connected to wheel cylinders 71FL (left front wheel) and 71RR (right rear wheel) via the pipe-tube 81b, a master cut valve 60b, the pipe-tube 82b, and the VSA unit 50.

<Stroke Simulator>

The stroke simulator 20 is a device generating an operational reaction force depending on the depression force onto the brake pedal 3 and includes: a cylinder body 21, a piston 22, spring members 23 and 24, and a spring seat 25.

Viewing FIG. 1 in an order from left to right, the cylinder body 21 accommodates a piston 22, a spring member 23, a spring seat 25, and a spring member 24 in a substantially coaxial manner. It should be noted that an opening of the cylinder body 21 is connected to a pipe-tube 81b via a pipe-tube 85 in which a normally closed simulator valve 60c is provided.

<Slave Cylinder>

The slave cylinder 30 (brake fluid pressure generator) is a device that generates a brake fluid pressure by operation of a motor actuator 31 to operate the wheel cylinders 71FR, 71RL, 71FL, and 71RR. The slave cylinder 30 mainly includes: the motor actuator 31, a gear mechanism 32, a ball screw structure 33, a cylinder body 34, pistons 35a and 35b, and spring members 37a and 37b.

Figure 2:
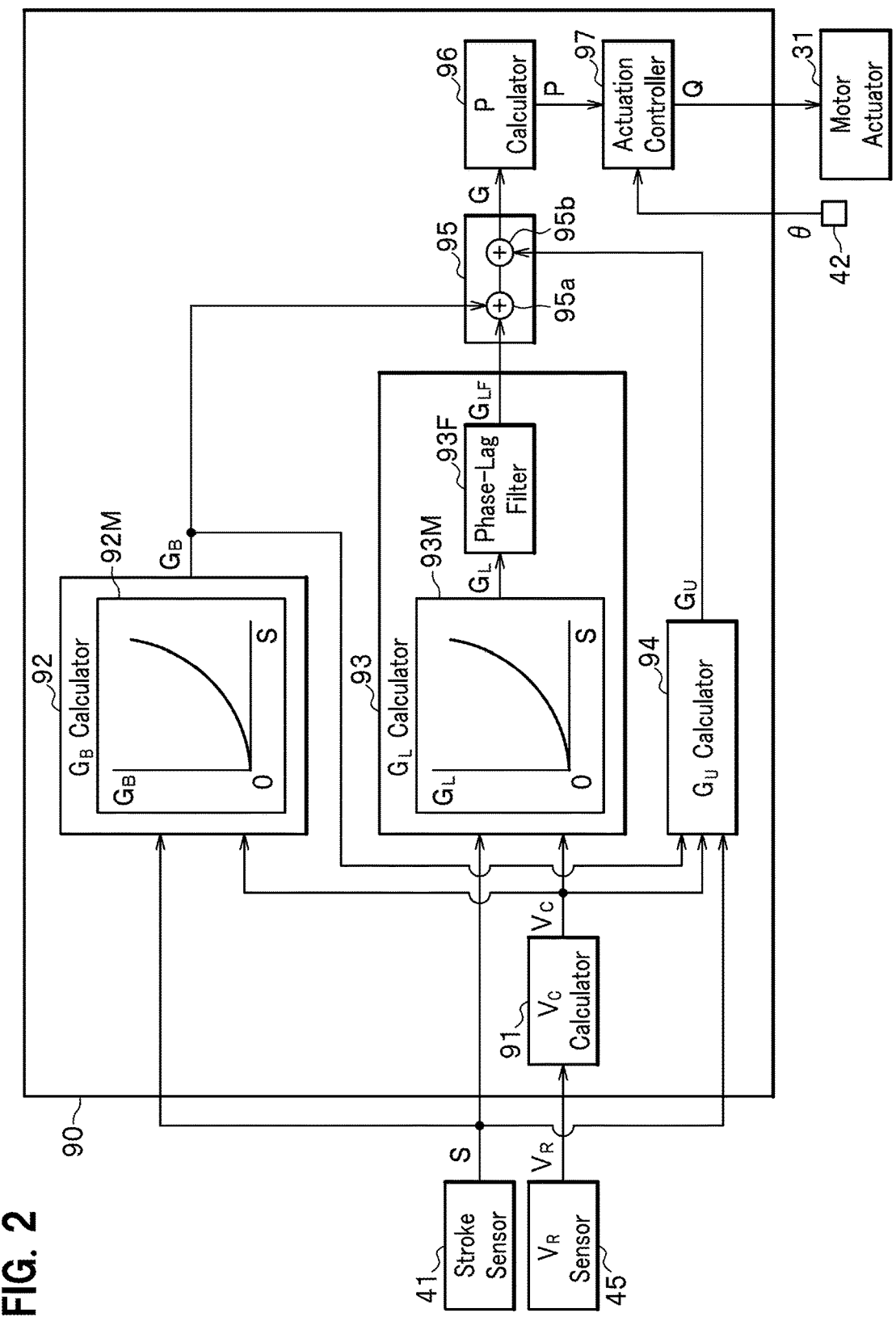
FIG. 2 is a functional block diagram of a controller included by the vehicle brake system.

The motor actuator 31 is a motor that is operated by a command signal Q sent by the controller 90 (see FIG. 2). The gear mechanism 32 is a mechanism that transmits a rotational actuation force from the motor actuator 31 to the ball screw structure 33. The ball screw structure 33 has balls 33a being rolled by a rotation of the gear mechanism 32, and a ball screw shaft 33b being advanced and retracted by the rolling of the balls 33a.

Viewing FIG. 1 in an order from right to left, the cylinder body 34 accommodates the ball screw shaft 33b, the piston 35a, the spring member 37a, the piston 35b, and the spring member 37b in a substantially coaxial manner. The pistons 35a and 35b have a cylindrical feature and are housed slidably in an axial direction in the cylinder body 34.

In addition, the slave cylinder 30 is provided with regulating members 38 and 39 for setting a maximum and minimum stroke by regulating relative movements of the pistons 35a and 35b.

When the motor actuator 31 is operated, a rotational actuation force of the motor actuator 31 is transmitted through the gear mechanism 32 to the ball screw structure 33, and advances the ball screw shaft 33b toward the left side on the FIG. 1. This advances the pistons 35a and 35b in the cylinder body 34, and generate brake fluid pressures in the pressure chambers Ha and Hb.

It should be noted that the configuration of the slave cylinder 30 may not be limited to that shown in FIG. 1, and other configurations that can generate the fluid pressure by operating the motor actuator 31 may be adopted.

As shown in FIG. 1, a back chamber Ja of the piston 35a communicates through a reservoir port Va with an inside of a reservoir 36. In addition, a back chamber Jb of the piston 35b communicates through a reservoir port Vb with an inside of the reservoir 36. The reservoir 36 is connected through a pipe-tube 86 to a reservoir 14 of the master cylinder 10.

Further, an output port Wa of the pressure chamber Ha is connected through pipe-tubes 83a, a portion of a pipe-tube 82a, and the VSA unit 50 to the wheel cylinders 71FR and 71RL.

And, an output port Wb of the pressure chamber Hb is connected through pipe-tubes 83b, a portion of a pipe-tube 82b, and the VSA unit 50 to the wheel cylinders 71FL and 71RR.

It should be understood that the wheel cylinder 71FR is configured to apply a braking force depending on the brake fluid pressure on the disk brake 70FR to brake the front right wheel (the same applies to the other wheel cylinders 71RL, 71FL, and 71RR).

<Sensors>

The stroke sensor 41 (stroke detector) is a sensor detecting a stroke (depression amount) of the brake pedal 3. For the stroke sensor 41, a sensor such as a potentiometer type or an optical type of sensor may be used. The stroke S detected by the stroke sensor 41 is output to the controller 90 (see FIG. 2).

The angle sensor 42 is a sensor for detecting a mechanical angle of a rotor (not shown) provided in the motor actuator 31, and incorporated in the motor actuator 31. The angle sensor 42 may be implemented using a Hall sensor, a resolver, or the like. Further, a position sensor may be used to detect a stroke of the ball screw shaft 33b (a movement from a predetermined reference position). The mechanical angle θ detected by the angle sensor 42 is outputted to the controller 90 (see FIG. 2).

A fluid pressure sensor 43 is a sensor for detecting a liquid pressure at a point closer to the master cylinder 10 than the master cut valves 60a and 60b, and installed in the pipe-tube 81a.

A fluid pressure sensor 44 is a sensor for detecting a liquid pressure at a point closer to the slave cylinder 30 than the master cut valves 60a and 60b, and installed in the pipe-tube 82b.

The fluid pressures detected by the fluid pressure sensors 43 and 44 are outputted to the controller 90 (see FIG. 2).

A wheel speed sensor 45 shown in FIG. 2 is a sensor for detecting a rotational speed of the wheel, and installed in each of the wheels. The rotational speeds of the wheels detected by the wheel speed sensors 45 are respectively outputted to the controller 90.

<VSA Unit>

The VSA unit 50 shown in FIG. 1 is a device used for stabilizing a vehicle behavior by generating a fluid pressure irrespective of a braking operation by a driver. The VSA unit 50 has various types of brake actuators and is connected to the wheel cylinders 71FR, 71RL, 71FL, and 71RR.

The configuration of the VSA unit 50 is well known, and thus, its detailed explanation is omitted, but it should be known that in a normal state, the fluid pressure generated by the slave cylinder 30 is supplied through the VSA unit 50 directly as is (or after appropriately adjusted) to the wheel cylinders 71FR, 71RL, 71FL, and 71RR to act thereon.

<Master Cut Valve>

The master cut valve 60a is a normally open solenoid valve that cuts off and retrieves communications between the pipe-tubes 81a and 82a according to a command from the controller 90 (see FIG. 2). The master cut valve 60b is a normally open solenoid valve that cuts off and retrieves communications between the pipe-tubes 81b and 82b according to a command from the controller 90 (see FIG. 2).

It should be noted that in normal operation, the master cut valves 60a and 60b are configured to be closed so that a pseudo reaction force from the stroke simulator 20 is applied on the brake pedal 3, and at the same time the vehicle is braked by the brake fluid pressure generated by the slave cylinder 30.

<Controller>

FIG. 2 is a functional block diagram of the controller 90 included in the vehicle brake system 1 (see FIG. 1 as necessary).

The controller 90 is configured to include electronic circuits such as a CPU (Central Processing Unit), ROM (Read Only Memory), RAM (Random Access Memory), and various types of interfaces, and to read out a program stored in the ROM to develop it in the RAM, and to make the CPU execute various processes.

As shown in FIG. 2, the controller 90 includes: a vehicle speed calculator 91, a base required-deceleration calculator 92, a responsive-feeling required-deceleration calculator 93, a build-up required-deceleration calculator 94, a required-deceleration calculator 95, a required fluid pressure calculator 96, and an actuation controller 97.

The vehicle speed calculator 91 is configured to have a function of calculating a vehicle speed $V_C$ (vehicle speed when the brake pedal 3 is depressed) on a basis of a wheel speed $V_R$ detected by the wheel speed sensor 45. The vehicle speed calculator 91 calculates the vehicle speed $V_C$ at a predetermined cycle on a basis of, for example, an average value of the wheel speeds $V_R$ inputted from the wheel speed sensors 45. The vehicle speed $V_C$ calculated by the vehicle speed calculator 91 is outputted to the base required-deceleration calculator 92, the responsive-feeling required-deceleration calculator 93, and the build-up required-deceleration calculator 94.

It should be understood that the responsive-feeling required-deceleration calculator 93 and the build-up required-deceleration calculator 94 are able to provide calculation results using the vehicle speed $V_C$ calculated when the brake pedal 3 is depressed to improve the driver's brake feeling.

The base required-deceleration calculator 92 is configured to have a function of calculating the base required-deceleration (first required-deceleration) $G_B$ on the basis of the stroke S inputted from the stroke sensor 41 and the vehicle speed $V_C$ inputted from the vehicle speed calculator 91. Here, the "base required-deceleration $G_B$" is a deceleration reflecting as is the depression of the brake pedal 3, and serves as a base of the required-deceleration G described later (see FIG. 4B). Note that the deceleration and the braking force are in a proportional relationship, and thus, when required to generate a large braking force, the required value of the deceleration also increases.

As shown in FIG. 2, the base required-deceleration calculator 92 has a base required-deceleration map 92M (a first map), which is a map for determining the base required-deceleration $G_B$ responding to the stroke S of the brake pedal 3, and stored in a storage (not shown) in advance.

The base required-deceleration map 92M is configured such that the base required-deceleration $G_B$ becomes greater as the stroke S of the brake pedal 3 becomes larger. That is, the base required-deceleration map 92M is configured such that the braking effect becomes greater as the driver stronger depresses the brake pedal 3.

Further, the base required-deceleration map 92M is configured such that the base required-deceleration $G_B$ becomes larger as the vehicle speed $V_C$ is faster, when the stroke S of the brake pedal 3 is constant. That is, the base required-deceleration map 92M is configured such that the brake works smoothly without giving a feeling of abruptness to the driver during a low-speed driving, and the brake works securely to give the driver a feeling of secureness during a high-speed driving.

The base required-deceleration $G_B$ is calculated at a predetermined cycle by the base required-deceleration calculator 92, and outputted to the build-up required-deceleration calculator 94 and the required-deceleration calculator 95.

Note that the base required-deceleration calculator 92 does not have a phase-lag filter unlike the responsive-feeling required-deceleration calculator 93 described later. Thus, for example, when the driver rapidly depresses the brake pedal 3 in an attempt to apply a sudden brake on a vehicle, the base required-deceleration $G_B$ calculated at a predetermined cycle rapidly increases and is outputted to the required-deceleration calculator 95 without a timing delay. This enables to prevent a response delay for the sudden brake.

The responsive-feeling required-deceleration calculator 93 is configured to have a function of calculating a responsive-feeling required-deceleration $G_{LF}$ (Second required-deceleration) on a basis of the stroke S inputted by the stroke sensor 41 and a vehicle speed $V_C$ inputted by the vehicle speed calculator 91. The "responsive-feeling required-deceleration $G_{LF}$" is a deceleration in order to improve a responsive-feeling of a brake (feeling of secureness that the brake is surely effective) for the driver, by generating a braking force at a timing slightly delayed from a time of the depression of the brake pedal 3.

As shown in FIG. 2, the responsive-feeling required-deceleration calculator 93 has a responsive-feeling required-deceleration map 93M (a second map) and a phase-lag filter 93F (phase-lag processor). The responsive-feeling required-deceleration map 93M is a map for determining the responsive-feeling required-deceleration $G_L$ responding to the stroke S of the brake pedal 3, and stored in advance in the storage unit (not shown)

The responsive-feeling required-deceleration map 93M is configured such that, for example, the responsive-feeling required-deceleration $G_L$ becomes greater as the stroke S of the brake pedal 3 becomes larger. Note that the responsive-feeling required-deceleration map 93M is not limited to the last example and may be configured using a map of other characteristics that would be capable of generating a braking force according to a strength of the depression of the brake pedal 3. For example, the responsive-feeling required-deceleration map 93M may be configured to increase the responsive-feeling required-deceleration $G_L$ linearly accompanying with an increase of the stroke S of the brake pedal 3, and to make the responsive-feeling required-deceleration $G_L$ constant in a map region in which the stroke S is greater than or equal to a predetermined value.

Further, the responsive-feeling required-deceleration map 93M is configured such that the responsive-feeling required-deceleration $G_L$ is greater as the vehicle speed $V_C$ is faster when the stroke S of the brake pedal 3 is constant. When the vehicle speed $V_C$ is low, the responsive-feeling required-deceleration $G_L$ is set to be smaller and thereby a variation in the braking force is reduced to allow the braking effect to be smooth. And, when the vehicle speed $V_C$ is high, the responsive-feeling required-deceleration $G_L$ is set to be greater and thereby provides the driver with a feeling of secureness that the brake working securely.

The responsive-feeling required-deceleration $G_L$ that is calculated at a predetermined cycle by the responsive-feeling required-deceleration calculator 93 is outputted to the phase-lag filter 93F.

The phase-lag filter 93F may be, for example, a low-pass filter (LPF), and configured to have a function of applying the phase-lag processing on the responsive-feeling required-deceleration $G_L$ determined according to the responsive-feeling required-deceleration map 93M. Therefore, the responsive-feeling required-deceleration $G_{LF}$ is outputted to the required-deceleration calculator 95 after a time delay since the stroke S is inputted to the responsive-feeling required-deceleration calculator 93. A lag time (time constant) of the phase-lag filter 93F is set such that this time lag makes the driver feel the brake responsive-feeling (feeling of secureness for the braking effect) but no discomfort.

Further, the phase-lag filter 93F is preferably configured to shorten the lag time as the vehicle speed $V_C$ inputted from the vehicle speed calculator 91 (vehicle speed when the brake pedal 3 is depressed) is slower, because when the vehicle speed $V_C$ is low, the depression amount on the brake pedal 3 is also often small, and thus, if the lag time described above is too long, it is rather more likely to make a driver feel discomfort.

The responsive-feeling required-deceleration $G_{LF}$ applied with the phase-lag processing by the phase-lag filter 93F is outputted to the required-deceleration calculator 95.

The build-up required-deceleration calculator 94 is configured to have a function of calculating a build-up required-deceleration $G_U$ (third required-deceleration) on the basis of the stroke S of the brake pedal 3, the vehicle speed $V_C$, and the base required-deceleration $G_B$. Note that the "build-up required-deceleration $G_U$" is a deceleration for gradually increasing the braking force while the brake pedal 3 is kept to be depressed.

The build-up required-deceleration calculator 94 gradually increases the build-up required-deceleration $G_U$ (third required-deceleration) when the stroke S of the brake pedal 3 is kept. For example, the build-up required-deceleration calculator 94 increases the build-up required-deceleration $G_U$ as the vehicle speed $V_C$ is decelerated based on a predetermined map or function, during an amount of change per unit time of the stroke S (>0) is within a predetermined range.

The gradual increase of the braking force as described above during keeping the depression of the brake pedal 3 and decelerating the vehicle enables to give the driver a feeling of secureness that the brake is well effective. The build-up required-deceleration $G_U$ that is calculated at a predetermined cycle by the build-up required-deceleration calculator 94 is outputted to the required-deceleration calculator 95.

The required-deceleration calculator 95 is configured to have a function of calculating a required-deceleration G by adding the base required-deceleration $G_B$, the responsive-feeling required-deceleration $G_{LF}$, and the build-up required-deceleration $G_U$.

The required-deceleration calculator 95 includes an adder 95a adding the base required-deceleration $G_B$ and the responsive-feeling required-deceleration $G_{LF}$; an adder 95b adding a value inputted by the adder 95a and the build-up required-deceleration $G_U$.

The required-deceleration G calculated by the required-deceleration calculator 95 is outputted to the required fluid pressure calculator 96.

The required fluid pressure calculator 96 is configured to calculate a required fluid pressure P that is a required value of the brake fluid pressure, based on the required-deceleration G inputted by the required-deceleration calculator 95. For example, the required fluid pressure calculator 96 multiplies the required-deceleration G and a predetermined coefficient to calculate the required fluid pressure P, and outputs the required fluid pressure P to an actuation controller 97.

The actuation controller 97 controls the operation of the motor actuator 31 included in the slave cylinder 30 (see FIG. 1) on the basis of the required fluid pressure P that is inputted from the required fluid pressure calculator 96. That is, the actuation controller 97 calculates a target value of a rotation angle (mechanical angle) of the motor actuator 31 associated with the required fluid pressure P. And then, the actuation controller 97 outputs a command signal Q based on a feedback control to the motor actuator 31 so as to make a detected value θ from the angle sensor 42 close to the above target value.

It should be understood that the actuation controller 97 may calculate a target value of the stroke of the ball screw shaft 33b (see FIG. 1) to perform the feedback control on the basis of a detected value by a sensor (not shown) that detects the stroke of the ball screw shaft 33b.

<Operation of Vehicle Brake System>

Figure 3:
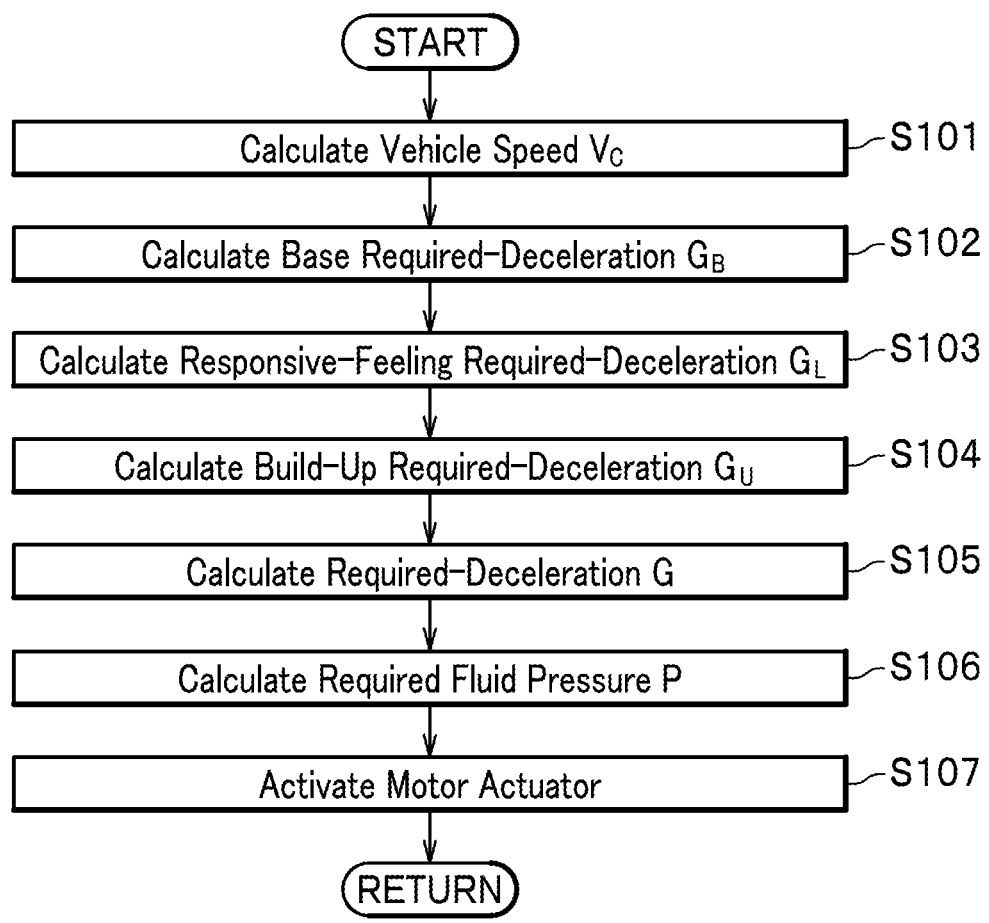
FIG. 3 is a flowchart illustrating a procedure of steps executed by the controller included by the vehicle brake system.

FIG. 3 is a flowchart showing a processing procedure (vehicle brake control method) performed by the controller 90 (see FIGS. 1 and 2 appropriately as necessary). Note that the depression of the brake pedal 3 is assumed to start at "START" shown in FIG. 3.

At step S101, the controller 90 calculates the vehicle speed $V_C$ on the basis of the wheel speeds $V_R$ inputted by the respective wheel speed sensors 45 using the vehicle speed calculator 91.

At step S102, the controller 90 calculates the base required-deceleration $G_B$ on the basis of the vehicle speed $V_C$ calculated at step S101 and the stroke S of the brake pedal 3 using the base required-deceleration calculator 92.

At step S103, the controller 90 calculates the responsive-feeling required-deceleration $G_L$ on the basis of the vehicle speed $V_C$ calculated at step S101 and the stroke S of the brake pedal 3 using the responsive-feeling required-deceleration calculator 93. Note that responsive-feeling required-deceleration $G_L$ is applied with the phase-lag processing by the phase-lag filter 94 to calculate the responsive-feeling required-deceleration $G_{LF}$.

At step S104, the controller 90 calculates the build-up required-deceleration $G_U$ on the basis of the vehicle speed $V_C$ calculated at step S101, the stroke S of the brake pedal 3, and the base required-deceleration calculated at step S103, using the build-up required-deceleration calculator 94.

At step S105, the controller 90 calculates the required-deceleration G by adding the base required-deceleration $G_B$ calculated at step S102, the responsive-feeling required-deceleration $G_{LF}$ (after applied with the phase-lag processing) calculated at step S103, and the build-up required-deceleration $G_U$ calculated at step S104.

At step S106, the controller 90 calculates the required fluid pressure P on the basis of the required-deceleration G calculated at step S105, using the required fluid pressure calculator 96.

At step S107, the controller 90 operates the motor actuator 31 on the basis of the required fluid pressure P calculated at step S106, using the actuation controller 97.

Note that a series of steps S101 to S107 is performed repeatedly in a predetermined cycle.

<Operation and Effect>

Figure 4A:
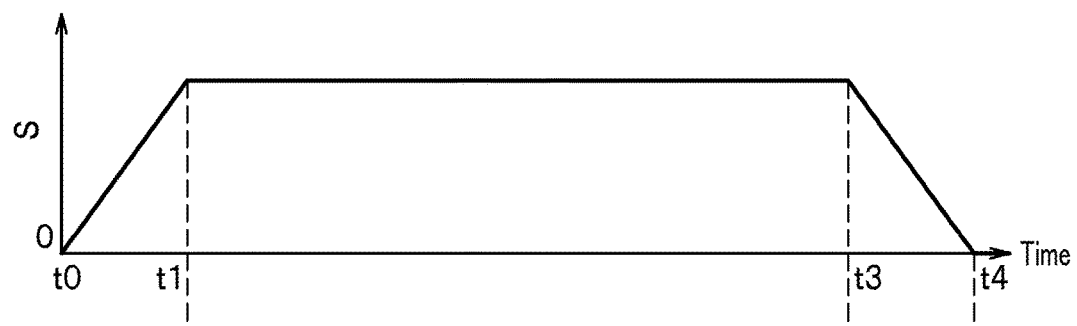
FIG. 4A is an explanatory diagram showing a time-dependent change characteristics of a stroke of a brake pedal.

FIG. 4A is an explanatory diagram showing a time-dependent change characteristics of the stroke S of the brake pedal 3. In the example shown in FIG. 4A, the brake pedal 3 is depressed during time t0 to t1, the stroke S of the brake pedal 3 is kept during time t1 to t3, and the brake pedal 3 is released back during time t3 to t4.

Figure 4B:
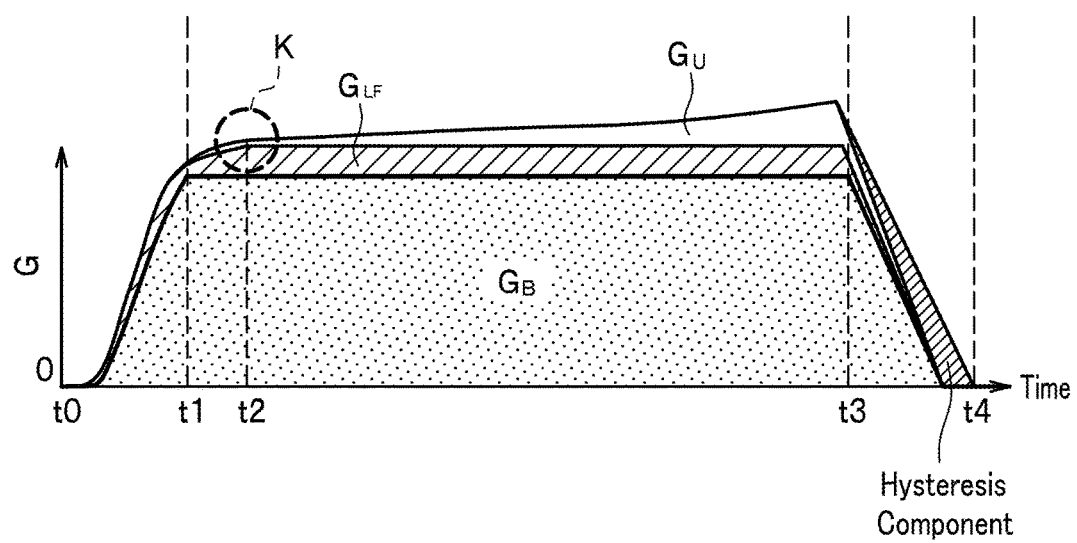
FIG. 4B is an explanatory diagram showing time-dependent change characteristics of a required-deceleration associated with the time-dependent characteristics of the stroke of the brake pedal shown in FIG. 4A.

FIG. 4B is an explanatory diagram showing a time-dependent change characteristics of the required-deceleration G associated with the time-dependent characteristics of the stroke S of the brake pedal 3 shown in FIG. 4A. Note that FIG. 4B separately illustrates each of the base required-decelerations $G_B$, the responsive-feeling required-deceleration $G_{LF}$, the build-up required-deceleration $G_U$, and a hysteresis component of deceleration described later, which are all included in the required-deceleration G.

The base required-deceleration $G_B$ is a deceleration that is calculated in response to the stroke S of the brake pedal 3 according to the base required-deceleration map 92M (see FIG. 2), as described above. Therefore, the base required-deceleration $G_B$ increases in response to the stroke S of the brake pedal 3 (immediately after time t0 to time t1), further keeps substantially constant (time t1 to t3), and then decreases (after time t3).

Further, the responsive-feeling required-deceleration $G_{LF}$ is a deceleration that is calculated in response to the stroke S of the brake pedal 3 according to the responsive-feeling required-deceleration map 93M (see FIG. 2) and further applied with the phase-lag processing, as described above. Therefore, a timing at which the responsive-feeling required-deceleration $G_{LF}$ reaches a peak (time t2) comes behind the time t1 at which the depression of the brake pedal 3 is started to be kept (see a portion of a graph indicated by a circle K drawn in a dashed line). Thus, further strengthening of the braking effect after the brake pedal 3 having been kept to be depressed may give the driver the feeling of sureness that the brake is securely working.

Incidentally, another configuration can be also thought of, which omits the responsive-feeling required-deceleration calculator 93 shown in FIG. 2 and is provided with a phase-lag filter in the base required-deceleration calculator 92 (see FIG. 2). However, in such a configuration, even if the driver wants to depress vigorously the brake pedal 3 to perform a rapid braking, the above mentioned phase-lag filter results in a response delay.

In contrast, the present embodiment has a configuration in which the phase-lag filter 93F (see FIG. 2) is included by the responsive-feeling required-deceleration calculator 93 (see FIG. 2) that is provided separately from the base required-deceleration calculator 92. Therefore, for the sudden braking of the vehicle, the base required-deceleration calculator 92 can immediately generate a braking force; and for a normal braking, the responsive-feeling required-deceleration calculator 93 can work to provide a good brake feeling to the driver, as described above.

In addition, the lag time for the phase-lag filter 93F is set to be shorter as the vehicle speed $V_C$ is slower. Therefore, during the low vehicle speed, the driver almost never feels a delay of the braking effect due to the responsive-feeling required-deceleration $G_{LF}$ (a feeling of discomfort that the braking force is unexpectedly increased after a delay from the time of depressing the brake).

Further, as shown in FIG. 4B, during the time t1 to t3 in which the stroke S of the brake pedal 3 is kept, the build-up required-deceleration $G_U$ is gradually increased, which is also accompanied by the gradual increase of the required-deceleration G. Thus, in the period in which the brake pedal 3 is kept to be depressed, the gradual increase of the braking force allows to give the driver the feeling of secureness of the good braking effect.

Incidentally, the hysteresis component of the deceleration shown in FIG. 4B is a deceleration for preventing a sudden decrease of the braking force accompanying a decrease of the build-up required-deceleration $G_U$ or the like. An amount of the hysteresis component of the deceleration is calculated such as to mitigate a reduction of a sum of the base required-deceleration $G_B$, the responsive-feeling required-deceleration $G_{LF}$, and the build-up required-deceleration $G_U$ after the reduction of the sum starts, on the basis of the base required-deceleration $G_B$, the responsive-feeling required-deceleration $G_{LF}$, and the build-up required-deceleration $G_U$.

Modification Example

The vehicle brake system 1 according to the present invention is described above according to the embodiment, but the present invention is not limited to the above description and allows various modifications to be adopted.

The above embodiment is explained as a case in which the required-deceleration G is calculated by adding the base required-deceleration $G_B$, the responsive-feeling required-deceleration $G_{LF}$, and the build-up required-deceleration $G_U$, but the present invention is not limited thereto. For example, in another embodiment, the motor actuator 31 may be operated according to a sum of the base required-deceleration $G_B$ and the responsive-feeling required-deceleration $G_{LF}$ applied with the phase-lag processing without being provided with the build-up required-deceleration calculator 94. Even such a configuration can improve the brake feeling of the driver by increasing the braking force (immediately) after the depression of the brake pedal 3 starts to be kept.

Further, the above described embodiment calculates the base required-deceleration $G_B$ and the responsive-feeling required-deceleration $G_L$ depending on the stroke S of the brake pedal 3 and the like, but the present invention is not limited thereto. For example, another embodiment may calculate a depression force associated with the stroke S of the brake pedal 3 according to a predetermined map and calculate the base required-deceleration $G_B$ and the responsive-feeling required-deceleration $G_L$ in response to the depression force.

Further more, the above-described embodiment calculates the base required-deceleration $G_B$, the responsive-feeling required-deceleration $G_L$, and the like on the basis of the stroke S inputted by the stroke sensor 41 and the vehicle speed $V_C$ inputted by the vehicle speed calculator 91, the present invention is not limited thereto. For example, the base required-deceleration $G_B$, the responsive-feeling required-deceleration $G_L$, and the like may be calculated only on the basis of the stroke S inputted by the stroke sensor 41.

In addition, in a case in which an input device such as a joystick (not shown) is operated to select a "sport mode", respective maps may be replaced by other ones for calculating the base required-deceleration $G_B$, the responsive-feeling required-deceleration $G_L$, and the build-up required-deceleration $G_U$. For example, in the sport mode, acceleration is powerful, and thus, each of the required-decelerations may be calculated according to each of maps that are set such that the braking effect is strengthened comparing a normal driving.

REFERENCE SIGNS LIST

1: vehicle brake system
3: brake pedal
10: master cylinder
20: stroke simulator
30: slave cylinder (brake fluid pressure generator)
31: motor actuator
41: stroke sensor (stroke detector)
45: wheel speed sensor
50: VSA unit
90: controller (controlling unit)
91: vehicle speed calculator
92: base required-deceleration calculator
92M: base required-deceleration map (first map)
93: responsive-feeling required-deceleration calculator
93M: responsive-feeling required-deceleration map (second map)
93F: phase-lag filter (phase-lag processor)
94: build-up required-deceleration calculator
95: required-deceleration calculator
96: required fluid pressure calculator
97: actuation controller

The invention claimed is:

1. A vehicle brake system comprising: a stroke detector configured to detect a stroke of a brake pedal; a brake fluid pressure generator including a motor actuator and configured to generate a brake fluid pressure by operation of the motor actuator; and a controller configured to control the operation of the motor actuator on a basis of a detected value by the stroke detector, the controller comprising: a first map for obtaining a first required-deceleration associated with a detected value by the stroke detector; and a second map for obtaining a second required-deceleration associated with the detected value by the stroke detector; and a phase-lag processor applying phase-lag processing on the second required-deceleration, and controlling the operation of the motor actuator on a basis of the first required-deceleration and the second required-deceleration applied with the phase-lag processing.

2. The vehicle brake system according to claim 1, wherein the controller shortens a lag time for the phase-lag processing as a vehicle speed is lower.

3. The vehicle brake system according to claim 2, wherein the controller increases a third required-deceleration gradually when the stroke of the brake pedal is kept depressed; and controls the operation of the motor actuator on the basis of the first required-deceleration, the second required-deceleration applied with the phase-lag processing, and the third required-deceleration.

4. The vehicle brake system according to claim 1, wherein the controller increases a third required-deceleration gradually when the stroke of the brake pedal is kept depressed; and controls the operation of the motor actuator on the basis of the first required-deceleration, the second required-deceleration applied with the phase-lag processing, and the third required-deceleration.

5. A vehicle brake control method executed by a vehicle brake system comprising: a stroke detector configured to detect a stroke of a brake pedal; a brake fluid pressure generator comprising a motor actuator and configured to generate a brake fluid pressure by operation of the motor actuator, and a controller configured to control the operation of the motor actuator on the basis of a detected value by the stroke detector, the method comprising steps executed by the controller of: determining on a bask of a first map a first required-deceleration associated with a detected value by the stroke detector; determining on a basis of a second map a second required-deceleration associated with the detected value by the stroke detector; and controlling the operation of the motor actuator on the basis of the first required-deceleration and the second required-deceleration applied with a phase-lag processing by a phase-lag-processor.

* * * * *